(12) United States Patent
Hellmann et al.

(10) Patent No.: US 6,362,729 B1
(45) Date of Patent: Mar. 26, 2002

(54) APPARATUS FOR KINESTHETIC SIGNALING TO THE DRIVER OF A MOTOR VEHICLE

(75) Inventors: Manfred Hellmann, Hardthof; Hermann Winner, Karlsruhe; Helmut Wiss, Moeglingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/465,876

(22) Filed: Dec. 16, 1999

(30) Foreign Application Priority Data

Dec. 16, 1998 (DE) .......................................... 198 57 992

(51) Int. Cl.$^7$ ................................................ B60Q 1/00
(52) U.S. Cl. ...................... 340/436; 340/435; 340/438; 340/439; 701/301; 180/169
(58) Field of Search ................................. 340/436, 435, 340/438, 439; 180/167, 170, 169; 701/301

(56) References Cited

U.S. PATENT DOCUMENTS 4,776,643 A    10/1988   Leiber ......................... 303/122
5,781,103 A     7/1998   Gilling ........................ 340/441

FOREIGN PATENT DOCUMENTS

| DE | 33 04 620 | 9/1983 |
| DE | 43 40 467 | 6/1995 |
| DE | 195 44 923 | 6/1996 |
| EP | 0 348 691 | 6/1989 |

OTHER PUBLICATIONS

Winner, Hermann et al., "Adaptive Cruise Control—System Aspects and Development Trends," Original of Paper No. 961010, SAE 96, Detroit, Feb. 26–29, 1996.

*Primary Examiner*—Daryl Pope
(74) *Attorney, Agent, or Firm*—Kenyon & Kenyon

(57) ABSTRACT

An apparatus for kinesthetic signaling to a driver of a motor vehicle is described. The apparatus signaling the driver if, in the context of a system for controlling vehicle speed, a deliberate shutdown or one occasioned by a malfunction is imminent or exists; or if, in the context of a system for controlling vehicle speed, a preset maximum deceleration value is not sufficient to prevent a collision between the motor vehicle and a preceding vehicle or an obstacle. The apparatus includes a device that modulates a braking setpoint, or a variable derived from it, in such a way that the motor vehicle experiences a temporally fluctuating deceleration that is perceptible by the driver.

13 Claims, 3 Drawing Sheets

APPARATUS FOR KINESTHETIC SIGNALING TO THE DRIVER OF A MOTOR VEHICLE

FIELD OF THE INVENTION

The present invention relates to an apparatus for kinesthetic signaling to the driver of a motor vehicle utilized, for example, in the context of an adaptive vehicle speed control system or spacing control system of a motor vehicle, which is also known as Adaptive Cruise Control (ACC).

BACKGROUND INFORMATION

The term "kinesthetic" derives from a Greek word, and is to be understood in the sense that the driver experiences bodily movements.

The paper "Adaptive Cruise Control—System Aspects and Development Trends" by Winner, Witte et al., presented as SAE Technical Paper Series No. 961010 at SAE, Feb. 26–29, 1996, describes a system for controlling the speed and/or spacing of a motor vehicle. An ACC system as described in the paper is capable of influencing the speed of the motor vehicle. One of the possibilities for doing so is by way of an active braking intervention. In this context, the maximum attainable braking effect is limited to a maximum value. In the event that this braking effect is not sufficient, for example, to come to a stop at a safe distance behind a preceding vehicle, it is necessary for the driver to be made aware of this situation. This can be done, for example, by way of an acoustic signal via a loudspeaker. German Patent No. 33 04 620 describes a device for maintaining a constant driving speed for motor vehicles. The device includes, inter alia, a detector that ascertains the spacing between the vehicle and a vehicle located in front of it, as well as a control system with which a suitable intervehicle spacing is determined. With this device, the vehicle speed resulting from the suitable intervehicle spacing is controlled primarily via a throttle valve displacement. In the event the throttle valve displacement alone is no longer sufficient to establish the desired vehicle speed or the desired intervehicle spacing, on the one hand a warning device is provided that prompts the driver to actuate the brakes or to steer around the preceding vehicle. On the other hand, in accordance with a further exemplary embodiment, provision is made for the control system to actuate the brake automatically.

German Patent No. 43 40 467 describes a hydraulic vehicle braking system, operating with external force, that makes it possible to transfer a desired brake pressure setpoint to the vehicle braking system, which controls the braking force in accordance with this definition.

European Patent No. 0 348 691 describes a method and an apparatus corresponding thereto for haptic indication of the spacing warning in a motor vehicle. In this context, if the spacing of the motor vehicle falls below a minimum value in both the forward and the rearward direction, a haptic indication is produced by vibrating the steering wheel, the driver's seat, or the entire passenger compartment. Vibration of the passenger compartment is made possible, inter alia, by activating the brakes or by acting on the brakes. This action makes it possible to produce vibrations at differing intensity and with different profiles, so that multi-stage spacing warnings can be transmitted to the driver.

German Patent No. 195 44 923 describes an apparatus and a method for vehicle control that informs the driver when a maximum braking force permitted by the vehicle control system is being applied, so that the driver can make the decision as to whether to take over control of the vehicle from the vehicle control system. In this context, a deceleration requirement is determined in an adder device in accordance with data supplied by a distance sensor. This deceleration requirement signal is applied to the input of a comparator, which determines whether the deceleration requirement is greater than the maximum deceleration achievable by the controller of the vehicle control system. If so, the comparator activates an information driver element. This element is connected to a flashing light, a sound generator, and a haptic control element. With the latter, the driver is informed by touch.

The conventional sensor systems generally do not make it possible to use ACC at very low speeds, since they do not have sufficient detection coverage in the close-in range. In order to prevent improper operation, the ACC function is shut down at low speeds.

Often, it is precisely the deceleration of the preceding vehicle that causes the speed to fall below the shutdown threshold. It is necessary in this case as well for the driver to be clearly and unequivocally made aware that the ACC system is not functioning.

Further reasons for shutting down the ACC without driver deactivation may include faults detected by the ACC system (including all necessary subsystems), or the risk of overheating the brakes.

SUMMARY OF THE INVENTION

An object of the present invention is to create a reliable signaling system for the driver of a motor vehicle in the context of systems that relate to longitudinal control of the motor vehicle.

DETAILED DESCRIPTION

Figure 1:
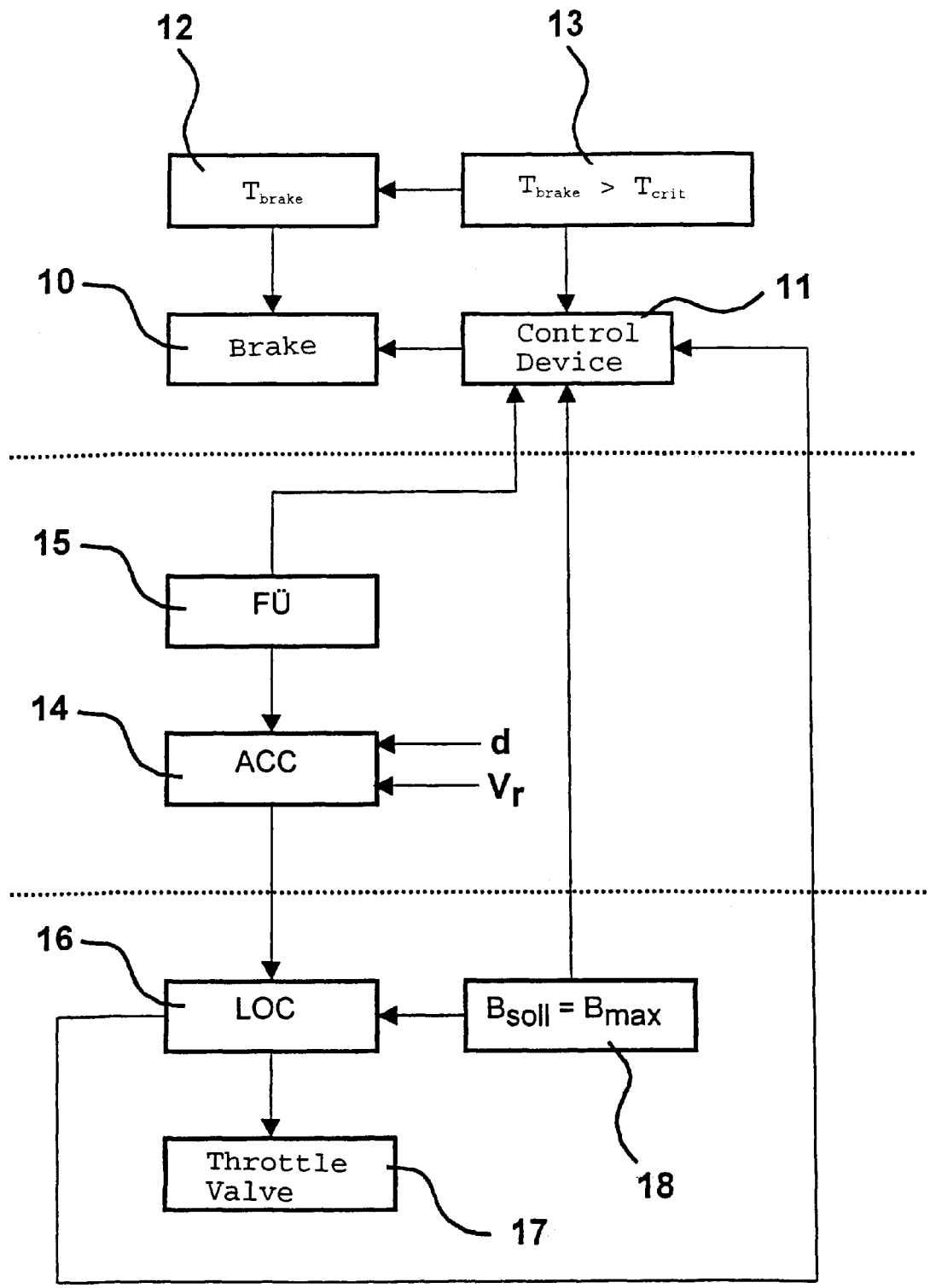
FIG. 1 shows a block diagram of an apparatus according to the present invention.

FIG. 1 shows a block diagram of an apparatus according to the present invention for kinesthetic signaling to the driver of a motor vehicle. The apparatus according to the present invention is subdivided into three principal components. The first component is the braking system, which includes brake 10, control device 11 for activating the brake, temperature monitor 12 for monitoring the operating temperature of the brake, and threshold module 13 for monitoring whether the temperature of the brake exceeds a defined critical temperature value. The next component of the apparatus according to the present invention includes ACC control device 14 and a function monitoring unit 15. The third module includes longitudinal control unit (LOC) 16, throttle valve 17, and a brake setpoint monitoring unit 18 that ascertains whether a specific brake setpoint ($B_{soll}$) exceeds a preset maximum deceleration value ($B_{max}$).

According to the present invention, the brake 10 is a brake that allows a braking intervention independent of the driver. This type of braking system can also be referred to, among other things, as an active braking system. During operation, brake 10 is monitored by temperature monitor 12 in terms of the operating temperature of the brake. This monitoring can be accomplished, for example, by way of a temperature sensor. During operation, threshold module 13 monitors temperature monitor 12 of the brake to determine whether the operating temperature of the brake ($T_{brake}$) exceeds a permissible critical temperature value ($T_{crit}$). If this critical operating temperature of brake 10 is exceeded, threshold module 13 causes control device 11 to modulate the current braking setpoint ($B_{soll}$) in such a way that the motor vehicle experiences a temporally fluctuating deceleration that is perceptible by the driver. The driver of the motor vehicle is thus made aware of the fact that a malfunction of the braking system exists and/or that a possible shutdown of the ACC system is imminent. The source from which the current braking setpoint ($B_{soll}$) arrives at control device 11 is immaterial for the apparatus according to the present invention. The braking setpoint ($B_{soll}$) can also, for example, derive from manual braking by the driver of the motor vehicle, or for example can be the result of an active intervention by a vehicle dynamics control system.

The principal component of a system for controlling the travel speed of a motor vehicle is ACC control device 14. This control device receives, from a spacing sensor (not shown in FIG. 1), at least the data concerning the spacing (d) from a preceding vehicle or from an obstacle, and data regarding the relative speed ($v_r$) between the controlled vehicle and the preceding vehicle or the obstacle. Based on these data, ACC control device 14 can determine whether activation of the brakes of the vehicle is necessary in order to prevent a collision between the controlled vehicle and a preceding vehicle or an obstacle. ACC control device 14 is monitored for proper functionality, while it is operating, by function monitoring unit 15. In the event that function monitoring unit 15 detects a malfunction within ACC control device 14 or within the overall system, control device 11 is once again caused to modulate the current braking setpoint ($B_{soll}$) in such a way that the motor vehicle experiences a temporally fluctuating deceleration that is perceptible by the driver. In this fashion, the driver of the motor vehicle is made aware of the malfunction of the vehicle speed control system (ACC system) and/or of an imminent possible shutdown of the ACC system.

In the case of both brake 10 and ACC control device 14, it is of course possible for the system for monitoring the operating temperature or the function monitoring system not to be present as an external element but rather to be designed as a self-diagnosis function and integrated into brake 10 or ACC control device 14.

The principal function of ACC control device 14 is to determine whether activation of the brakes of the vehicle is necessary, or whether optionally it is possible to accelerate the vehicle to a speed desired by the driver. The result of ACC control device 14 is a desired acceleration that is transferred to longitudinal control unit (LOC) 16. Longitudinal control unit 16 forwards this acceleration input, transferred from ACC control device 14, to the corresponding actuators. These can comprise, for example, throttle valve 17, which makes possible both acceleration and moderate deceleration. If the moderate deceleration resulting from "letting off the gas" is not sufficient to meet the acceleration or deceleration requirement of ACC control device 14, brake 10 is activated via control device 11. To prevent inadvertent and, in some circumstances, hazardous braking operations, the maximum permissible deceleration that can be requested by longitudinal control unit 16 from control device 11 is limited. Above this maximum braking value ($B_{max}$), the vehicle speed control system is not capable of decelerating the vehicle further in order to prevent a collision between the controlled vehicle and a preceding vehicle or an obstacle. Once this maximum braking value ($B_{max}$) has been reached, it is necessary for the driver of the motor vehicle to be informed of this circumstance. A transfer request or signal must be given to the driver, making him or her aware of this circumstance. For this purpose, braking setpoint monitoring unit 18 monitors longitudinal control unit 16 to determine whether the current braking setpoint ($B_{soll}$) has reached the maximum permissible braking value ($B_{max}$). If so, braking setpoint monitoring unit 18 activates control device 11 to modulate the current braking setpoint ($B_{soll}$) in such a way that the motor vehicle experiences a temporally fluctuating deceleration that is perceptible by the driver. By way of this kinesthetic signal to the driver of the motor vehicle, the driver is made aware of the fact that a preset maximum deceleration value is not sufficient to prevent a collision between the controlled vehicle and a preceding vehicle or an obstacle. The driver of the motor vehicle now has the opportunity either to decelerate his or her vehicle manually, or to avoid the preceding vehicle or the obstacle. In either situation, the ACC system detects that the hazardous situation no longer exists, and terminates the temporally fluctuating deceleration of the motor vehicle. Also possible is a limited-duration modulation period that informs the driver of a motor vehicle of a system state, for a predefined period of time, by way of a kinesthetic signal.

The maximum deceleration ($B_{max}$) itself can be a function of speed. In particular, at lower speeds it can be reduced so that it is equivalent to shutting down the ACC function. The condition $B_{soll} < B_{max}$ then comes into effect. The resulting kinesthetic signal provides the driver with the takeover request.

The apparatus according to the present invention offers the advantage that the kinesthetic signal to the driver is an unequivocal and always perceptible signal. In addition, the apparatus according to the present invention can be implemented with few changes to the components already present in a motor vehicle.

The braking values described can be, for example, acceleration values or torque values, depending in each case on the individual interface parameters of the controlled vehicle.

Figure 2:
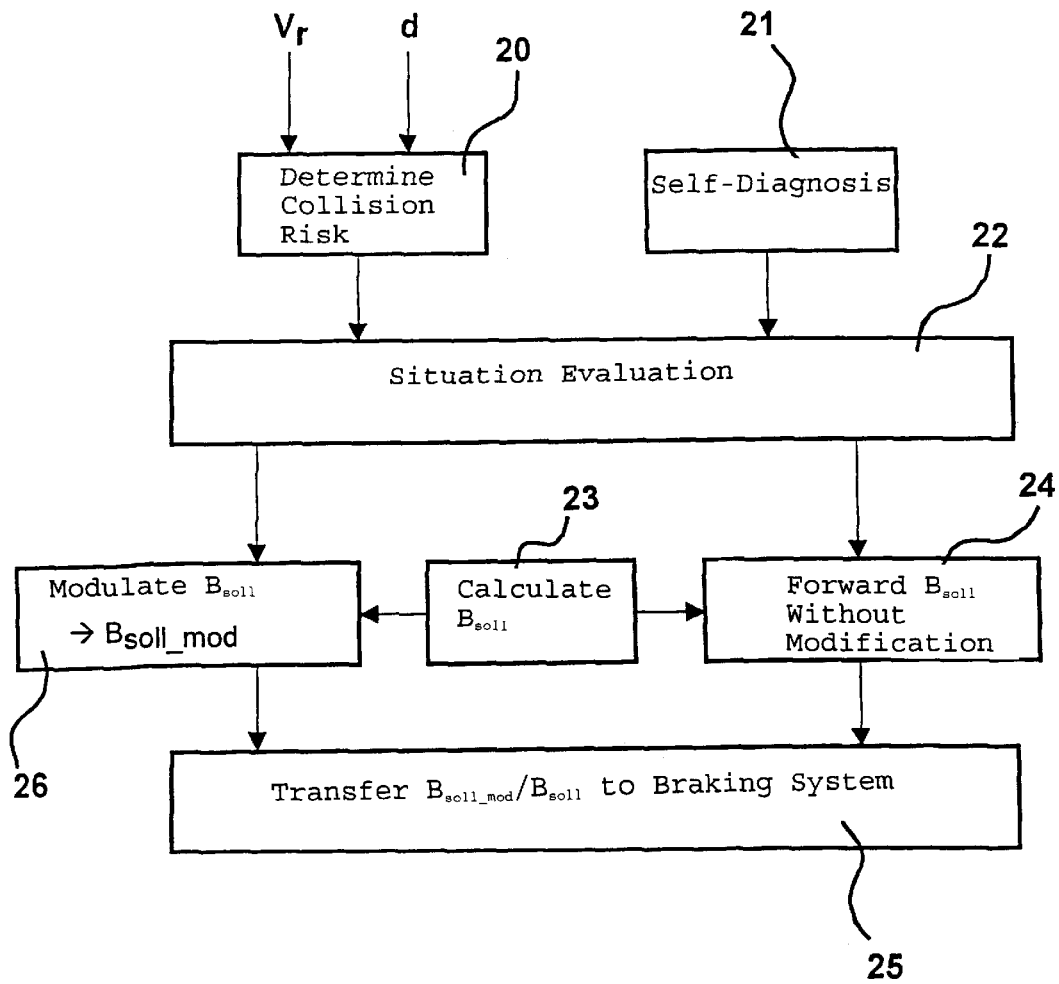
FIG. 2 shows a block diagram of a first embodiment of an apparatus according to the present invention.

FIG. 2 depicts an exemplary embodiment of the apparatus according to the present invention for kinesthetic signaling to the driver of a motor vehicle. The block diagram depicted in FIG. 2 refers to a control device that is arranged separately from a control device of the braking system. In this specific embodiment this is, for example, the control device of a vehicle speed control system (ACC). With this system, using a spacing sensor (not shown in FIG. 2), at least the variables representing the spacing (d) from a preceding vehicle or an obstacle, and the relative speed ($v_r$) between the controlled vehicle and the preceding vehicle or the obstacle, are determined and are transmitted to analysis unit 20. This analysis unit 20 determines, from these data, the collision risk arising from the preceding vehicle or the obstacle, taking into account the maximum permissible braking value. Also present is a self-diagnosis unit 21 that, during operation, monitors the functionality of the vehicle speed control system. Both the result of analysis unit 20 regarding the collision risk and the result of self-diagnosis unit 21 regarding functionality are transferred to a situation evaluation unit 22. Based on the data transferred from analysis unit 20, situation evaluation unit 22 initiates, in calculation unit 23, a calculation of the necessary braking setpoint ($B_{soll}$). The braking setpoint ($B_{soll}$) determined in calculation unit 23 is supplied back to situation evaluation unit 22. On the basis of the data now available, situation evaluation unit 22 can activate either transmitting unit 24 or modulation unit 26. For the case in which the braking setpoint ($B_{soll}$) determined by calculation unit 23 is less than a preset maximum deceleration value ($B_{max}$), and the signal supplied by self-diagnosis unit 21 indicates no malfunction, unmodified transmission of the braking setpoint ($B_{soll}$) to transfer unit 25 is initiated via transmitting unit 24. This transfer unit 25 then transfers to the active braking system the braking setpoint ($B_{soll}$) that has been determined. For the case in which the braking setpoint signal ($B_{soll}$) supplied by calculation unit 23 has reached the preset maximum deceleration value ($B_{max}$), or the signal supplied by self-diagnosis unit 21 indicates a malfunction, modulation of the braking setpoint ($B_{soll}$) in modulation unit 26 is initialized by situation evaluation unit 22. In this context, the braking setpoint ($B_{soll}$) is modulated within modulation unit 26 in such a way that the motor vehicle experiences a temporally fluctuating deceleration that is perceptible by the driver. This modulated braking setpoint ($B_{soll\_mod}$) is transferred by transfer unit 25 to the active braking system.

With this embodiment, the modulated braking setpoint signal ($B_{soll\_mod}$) is thus generated in the control device of the vehicle speed control system, and transferred in that form to the active braking system. An advantageous modulation of the braking setpoint ($B_{soll}$) occurs, at a frequency of up to 3 Hz. A temporally fluctuating deceleration that is particularly advantageous and easily perceived by the driver of the motor vehicle moreover results when the braking setpoint ($B_{soll}$) is modulated in such a way that the deceleration fluctuations elicited lie approximately between –0.5 m/s² and +0.5 m/s².

Figure 3:
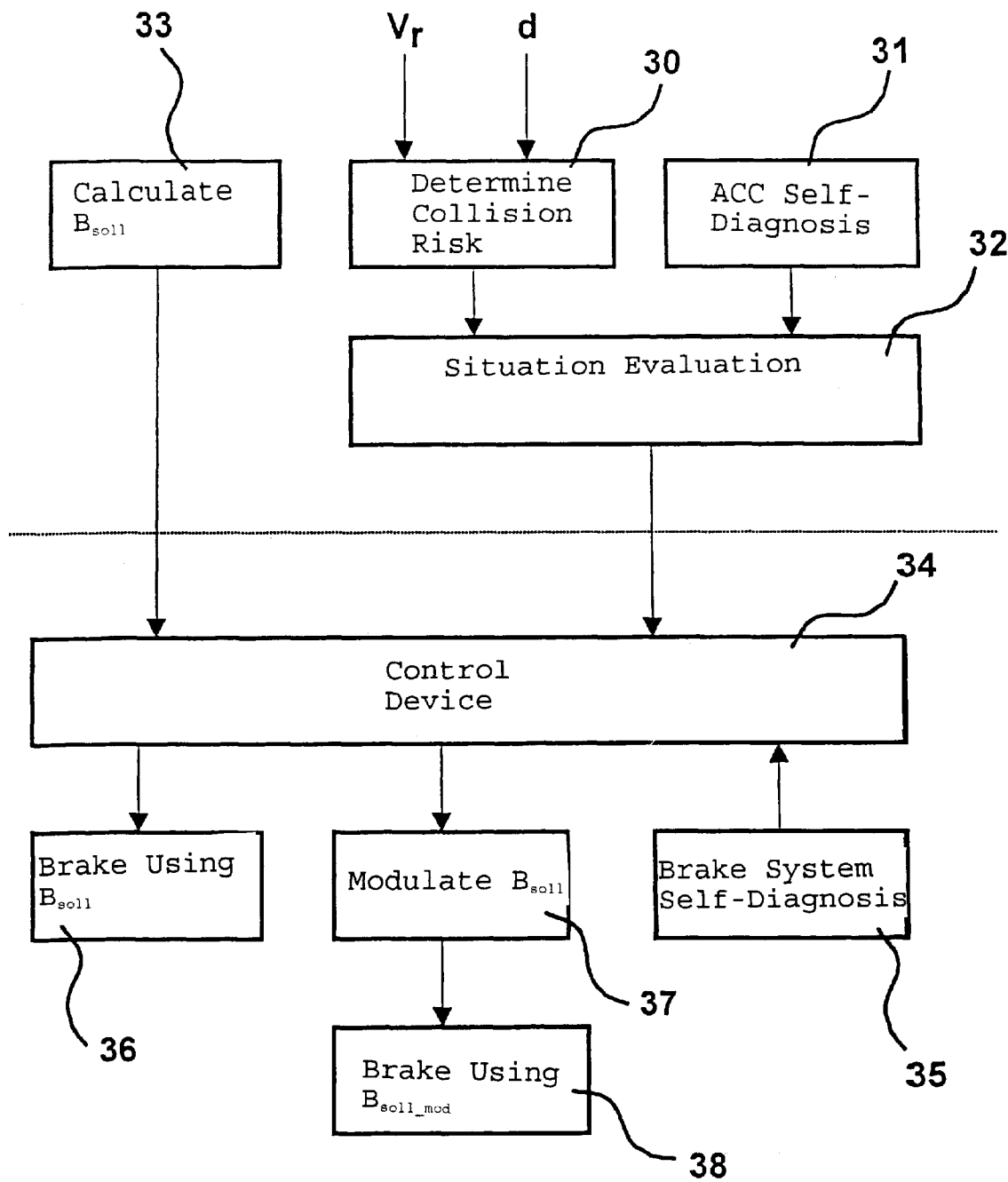
FIG. 3 shows a block diagram of a second embodiment of an apparatus according to the present invention.

FIG. 3 shows the block diagram of a second exemplary embodiment of the apparatus according to the present invention. The block diagram of FIG. 3 is subdivided into two portions: blocks 30 through 33 belong to a vehicle speed control system, and blocks 34 through 38 represent elements of an active braking system. As in the case of the exemplary embodiment described with reference to FIG. 2, with this exemplary embodiment as well, at least the variables representing relative speed ($v_r$) and spacing (d) are ascertained by a spacing sensor (not depicted here) and supplied to an analysis unit 30. This analysis unit 30 determines, by analogy with the previous exemplary embodiment, the collision risk presented by a preceding vehicle or by an obstacle, taking into account the maximum permissible braking value. Also present, again analogously to the previous exemplary embodiment, is a self-diagnosis unit 31 that monitors the vehicle speed control system for proper functionality. The results of analysis unit 30 and self-diagnosis unit 31 flow into situation evaluation unit 32. If it is concluded in situation evaluation unit 32, on the basis of the signal transmitted by analysis unit 30, that a collision risk exists, calculation of the braking setpoint ($B_{soll}$) in calculation unit 33 is initialized by situation evaluation unit 32. This calculation unit 33 determines, on the basis of the data transmitted by the situation evaluation unit, the currently necessary braking setpoint ($B_{soll}$), which is determined in such a way that a preset maximum deceleration value ($B_{max}$) is not exceeded. The output signals of calculation unit 33 and situation evaluation unit 32 are transferred, beyond the boundary of the vehicle speed control system, to active braking control device 34. Additional data are received by active braking control device 34 from active braking self-diagnosis unit 35, which monitors the braking system for malfunctions. Malfunctions of the active braking system can occur, for example, as a result of overheated wheel brakes.

For the case in which neither a malfunction of the vehicle speed control system nor a malfunction of the active braking system exists, and the braking setpoint ($B_{soll}$) has not reached the preset maximum deceleration value ($B_{max}$), active braking control device 34 initiates the braking operation, by way of transfer unit 36, using the braking setpoint ($B_{soll}$) that has been determined. For the case in which the braking setpoint ($B_{soll}$) determined by calculation unit 33 has reached the preset maximum deceleration value ($B_{max}$), a malfunction of the vehicle speed control system is signaled by situation evaluation unit 32, or a malfunction of the active braking system is signaled by active braking self-diagnosis unit 35, active braking control device 34 initializes modulation unit 37. Modulation unit 37 modulates the previously determined braking setpoint ($B_{soll}$), which in this case is identical to the preset maximum deceleration value ($B_{max}$), in such a way that the motor vehicle experiences a temporally fluctuating deceleration that is perceptible to the driver. The braking setpoint modulated by modulation unit 37 ($B_{soll\_mod}$) is transferred by transfer unit 38 to the corresponding braking control device in order to initiate braking using $B_{soll\_mod}$.

According to an example embodiment of the present invention that at least one pattern of a modulated braking setpoint is stored in a memory. This modulated braking setpoint advantageously corresponds to the preset maximum deceleration value. This has the advantage that in the event a signal to the driver of the motor vehicle is necessary, no modulation of the braking setpoint needs to be performed, but rather, the latter is already present as a modulation pattern. In this case, therefore, all that is necessary is a signal that triggers the corresponding modulation, and not a separate transfer of the modulated braking setpoint. This is advantageous especially if the preset maximum deceleration value is constant. In that case the stored modulation pattern is advantageously identical to the modulated maximum deceleration value ($B_{soll\_mod} = B_{max\_mod}$).

The particular control devices in which the individual functions are integrated are fundamentally immaterial in terms of the concept according to the present invention of the apparatus for kinesthetic signaling.

What is claimed is:

1. An apparatus for kinesthetic signaling to the driver of a motor vehicle comprising:
   a modulator modulating one of a braking setpoint and a variable derived from the braking setpoint so that the motor vehicle experiences a temporally fluctuating deceleration that is perceptible by the driver if one of:
   a deliberate shutdown is one of imminent and present,
   a shutdown occasioned by a malfunction is one of imminent and present, and
   a preset maximum deceleration value is not sufficient to prevent a collision between the motor vehicle and one of a preceding vehicle and an obstacle.

2. An apparatus for kinesthetic signaling to the driver of a motor vehicle, comprising:
   a modulator modulating one of a braking setpoint and a variable derived from the braking setpoint so that the motor vehicle experiences a temporally fluctuating deceleration that is perceptible by the driver if one of:
   a deliberate shutdown is one of imminent and present,
   a shutdown occasioned by a malfunction is one of imminent and present, and
   a preset maximum deceleration value is not sufficient to prevent a collision between the motor vehicle and one of a preceding vehicle and an obstacle; and
   at least one spacing sensor monitoring at least a spacing from one of the preceding vehicle and the obstacle;
   wherein the braking setpoint is transferred to a braking system if an activation of brakes is necessary;
   wherein the braking setpoint is determined so that the preset maximum deceleration value is not exceeded; and
   wherein a signal is provided to the driver of the motor vehicle if the preset maximum deceleration value is not sufficient to prevent the collision between the motor vehicle and the one of the preceding vehicle and the obstacle.

3. The apparatus according to claim 2, wherein the modulator forms at least a portion of a first control device, the first control device being separate from a second control device of the braking system, the braking setpoint being transferred as a modulated braking setpoint to the second control device of the braking system.

4. The apparatus according to claim 3, wherein the first control device forms a portion of a system for controlling vehicle speed.

5. The apparatus according to claim 2, wherein
the braking setpoint is transferred in an unmodulated fashion to a control device of the braking system;
an activation signal is transferred to the control device of the braking system; and
the modulation of the braking setpoint occurs in the control device of the braking system.

6. The apparatus according to claim 2, wherein at least one pattern of a modulated braking setpoint is stored in a memory.

7. The apparatus according to claim 6, wherein the modulated braking setpoint corresponds to the preset maximum deceleration value.

8. An apparatus for kinesthetic signaling to the driver of a motor vehicle, comprising:
a modulator modulating one of a braking setpoint and a variable derived from the braking setpoint so that the motor vehicle experiences a temporally fluctuating deceleration that is perceptible by the driver if one of:
a deliberate shutdown is one of imminent and present,
a shutdown occasioned by a malfunction is one of imminent and present, and
a preset maximum deceleration value is not sufficient to prevent a collision between the motor vehicle and one of a preceding vehicle and an obstacle;
wherein the braking setpoint is modulated at a frequency of up to 3 Hz.

9. An apparatus for kinesthetic signaling to the driver of a motor vehicle, comprising:
a modulator modulating one of a braking setpoint and a variable derived from the braking setpoint so that the motor vehicle experiences a temporally fluctuating deceleration that is perceptible by the driver if one of:
a deliberate shutdown is one of imminent and present,
a shutdown occasioned by a malfunction is one of imminent and present, and
a preset maximum deceleration value is not sufficient to prevent a collision between the motor vehicle and one of a preceding vehicle and an obstacle;
wherein the temporally fluctuating deceleration effected by modulation of the braking setpoint is approximately between $-0.5$ m/s$^2$ and $+0.5$ m/s$^2$.

10. An apparatus for kinesthetic signaling to the driver of a motor vehicle, comprising:
a modulator modulating one of a braking setpoint and a variable derived from the braking setpoint so that the motor vehicle experiences a temporally fluctuating deceleration that is perceptible by the driver if one of:
a deliberate shutdown is one of imminent and present,
a shutdown occasioned by a malfunction is one of imminent and present, and
a preset maximum deceleration value is not sufficient to prevent a collision between the motor vehicle and one of a preceding vehicle and an obstacle;
wherein the modulator modulates the one of the braking setpoint and the variable derived from the braking setpoint so that the motor vehicle experiences the temporally fluctuating deceleration that is perceptible by the driver if:
a deliberate shutdown is one of imminent and present.

11. An apparatus for kinesthetic signaling to the driver of a motor vehicle, comprising:
a modulator modulating one of a braking setpoint and a variable derived from the braking setpoint so that the motor vehicle experiences a temporally fluctuating deceleration that is perceptible by the driver if one of:
a deliberate shutdown is one of imminent and present,
a shutdown occasioned by a malfunction is one of imminent and present, and
a preset maximum deceleration value is not sufficient to prevent a collision between the motor vehicle and one of a preceding vehicle and an obstacle;
wherein the modulator modulates the one of the braking setpoint and the variable derived from the braking setpoint so that the motor vehicle experiences the temporally fluctuating deceleration that is perceptible by the driver if:
a shutdown occasioned by a malfunction is one of imminent and present.

12. An apparatus for kinesthetic signaling to the driver of a motor vehicle, comprising:
a modulator modulating one of a braking setpoint and a variable derived from the braking setpoint so that the motor vehicle experiences a temporally fluctuating deceleration that is perceptible by the driver if one of:
a deliberate shutdown is one of imminent and present,
a shutdown occasioned by a malfunction is one of imminent and present, and
a preset maximum deceleration value is not sufficient to prevent a collision between the motor vehicle and one of a preceding vehicle and an obstacle;
wherein the modulator modulates the one of the braking setpoint and the variable derived from the braking setpoint so that the motor vehicle experiences the temporally fluctuating deceleration that is perceptible by the driver if:
a preset maximum deceleration value is not sufficient to prevent a collision between the motor vehicle and one of a preceding vehicle and an obstacle.

13. An apparatus for kinesthetic signaling to the driver of a motor vehicle, comprising:
a modulator modulating one of a braking setpoint and a variable derived from the braking setpoint so that the motor vehicle experiences a temporally fluctuating deceleration that is perceptible by the driver if one of:
a deliberate shutdown is one of imminent and present,
a shutdown occasioned by a malfunction is one of imminent and present, and
a preset maximum deceleration value is not sufficient to prevent a collision between the motor vehicle and one of a preceding vehicle and an obstacle; and
a spacing sensor determining:
at least a spacing from the one of the preceding vehicle and the obstacle;
a relative speed variable representing a relative speed between the motor vehicle and one of the preceding vehicle and the obstacle; and
whether an activation of the brakes of the motor vehicle is necessary as a function of the spacing and the relative speed variable.

* * * * *